(12) United States Patent
Beyfuss et al.

(10) Patent No.: US 8,398,311 B2
(45) Date of Patent: Mar. 19, 2013

(54) BEARING ARRANGEMENT

(75) Inventors: Berthold Beyfuss, Kaisten (DE);
Burkhard Buchheim, Schweinfurt (DE); Alexander Dilje, Schweinfurt (DE); Hans-Jürgen Friedrich, Königsberg (DE); Helmut Hauck, Euerbach (DE); Holger Kristandt, Euerbach (DE); Alfred Radina, Massbach (DE); Jonas Schierling, Hassfurt (DE)

(73) Assignee: Aktiebolaget SKF, Göteborg (SE)

( * ) Notice: Subject to any disclaimer, the term of this patent is extended or adjusted under 35 U.S.C. 154(b) by 124 days.

(21) Appl. No.: 13/061,539

(22) PCT Filed: Sep. 1, 2009

(86) PCT No.: PCT/EP2009/006307
§ 371 (c)(1),
(2), (4) Date: May 19, 2011

(87) PCT Pub. No.: WO2010/025886
PCT Pub. Date: Mar. 11, 2010

(65) Prior Publication Data
US 2011/0211782 A1 Sep. 1, 2011

(30) Foreign Application Priority Data
Sep. 3, 2008 (DE) .................... 10 2008 045 464

(51) Int. Cl.
*F16C 35/06* (2006.01)
(52) U.S. Cl. ..................................... 384/537
(58) Field of Classification Search .......... 384/537, 384/561, 584, 585, 903, 551
See application file for complete search history.

(56) References Cited

U.S. PATENT DOCUMENTS

| | | | |
|---|---|---|---|
| 3,888,597 A | | 6/1975 | Datta |
| 6,106,155 A | * | 8/2000 | Beyfuss et al. ............. 384/537 |
| 6,279,231 B1 | * | 8/2001 | Beyfuss et al. ............. 29/898.07 |
| 6,408,519 B1 | | 6/2002 | Beyfuss et al. |
| 6,506,038 B2 | * | 1/2003 | Sjoholm et al. ............. 384/537 |
| 6,652,150 B2 | * | 11/2003 | Buchheim et al. ............. 384/537 |

FOREIGN PATENT DOCUMENTS

| | | |
|---|---|---|
| DE | 965893 C | 6/1957 |
| DE | 2306944 A1 | 9/1973 |
| DE | 2460448 A1 | 6/1976 |
| DE | 9318402 U1 | 2/1994 |
| DE | 29802228 U1 | 3/1998 |
| DE | 19937396 A1 | 3/2001 |
| DE | 20019278 U1 | 4/2001 |
| DE | 10250733 A1 | 6/2003 |
| DE | 102004038952 A1 | 3/2006 |

(Continued)

*Primary Examiner* — Thomas R Hannon
(74) *Attorney, Agent, or Firm* — Mark A. Ussai; Bryan Peckjian

(57) ABSTRACT

A bearing assembly comprises at least two adjacently-disposed bearings. Each bearing includes a bearing outer ring having a cylindrical outer circumferential surface. A bearing support retains the at least two bearings such that respective rotational axes of the at least two bearings extend in parallel. A spacer has at least two cylindrical openings configured to receive the respective cylindrical outer circumferential surfaces of the bearing outer rings such that a circumferential inner surface of each opening covers at least a portion of a width of the bearing outer ring received therein and surrounds an entire circumference of the bearing outer ring received therein. The bearing support is not fixedly connected to the spacer.

20 Claims, 1 Drawing Sheet

FOREIGN PATENT DOCUMENTS

| | | |
|---|---|---|
| DE | 102004053078 A1 | 5/2006 |
| DE | 102005012323 B3 | 6/2006 |
| EP | 1072806 A2 | 1/2001 |
| EP | 1731778 A2 | 12/2006 |
| FR | 2631402 A1 | 11/1989 |

* cited by examiner

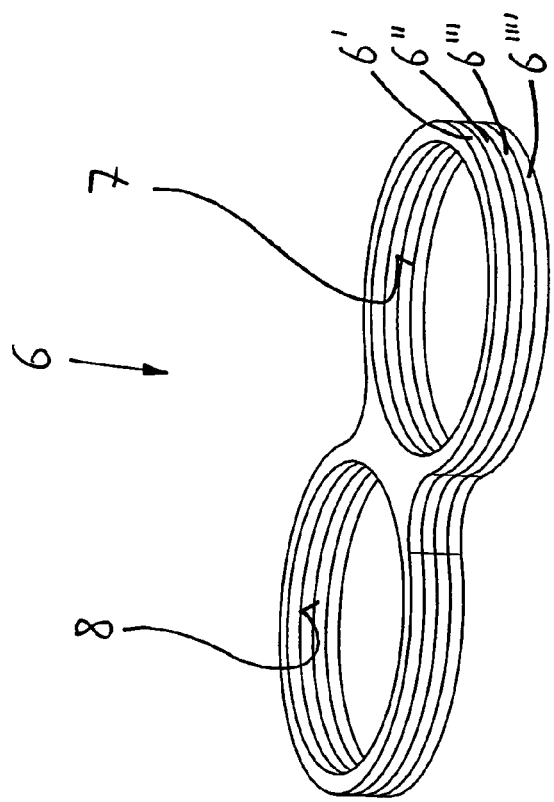
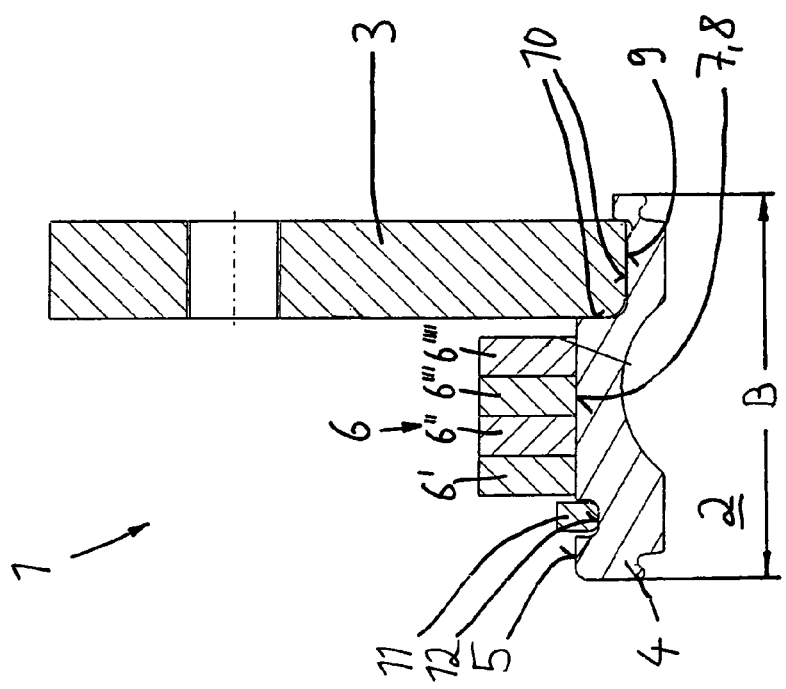
Fig. 1
Fig. 2

BEARING ARRANGEMENT

CROSS-REFERENCE

This application is the U.S. national stage of International Application No. PCT/EP2009/006307 filed on Sep. 1, 2009, which claims priority to German patent application no. 10 2008 045 464.8 filed on Sep. 3, 2008.

TECHNICAL FIELD

The invention relates to a bearing assembly comprising at least two adjacently-disposed bearings and a bearing support retaining the bearings, wherein the rotational axes of the at least two bearings are parallel and spaced relative to one another and wherein each bearing includes a bearing outer ring having a cylindrical circumferential surface.

RELATED ART

A bearing assembly of this type is known from DE 298 02 228 U1. Here, a bearing support in the shape of a planar plate is described, in which pot-shaped recesses are formed by a deep drawing process; the recesses form a cylindrical seating surface for a roller bearing. Then the outer rings of the roller bearing are pressed into the recesses. In this way, it is possible to support two roller bearings close to one another with their rotational axes oriented parallel to one another. For example, such a bearing assembly is required in transmission gears when two gear shafts must be supported close to one another.

In particular in automobile transmission manufacturing, bearing supports are, in most cases, either fabricated from a plastically deformed plate—as the above-mentioned, known solution shows—or they are produced from light metal and/or steel by cutting. While the solution made from the plastically deformed plate has relatively poor tolerances (size, shape and positional tolerances), bearing supports produced by cutting are relatively costly. The bearing supports are often embodied in a one-piece manner, wherein solutions made from a plurality of parts are also known. In this respect, reference is made to EP 1 072 806 B1.

Due to the geometrical relationships, the entire circumference of the abutment surface of the bearing seat is not available when the bearings move closer and closer together. Moreover, a spandrel-like imperfection is created at the point where the bearings are the closest to one another, which imperfection does not ensure a radial support of the bearing. In the case of closely-adjacent bearings, it is also disadvantageous that the bearing support does not provide a completely-enclosed radial bearing guide in the area of the bearing seat. A 360° encircling support of the bearing does not result in the radial direction, because the small axial spacing and the manufacturing process of the bearing support (in most cases, by deep-drawing) cannot realize it. Consequently, high shape- and positional imprecisions of the bearing seat are possible in the bearing support, which can adversely affect the useful life of the bearing. Depending on the application, in case a complete radial support of the bearing is required, it cannot be ensured by known bearing supports. The current trend towards minimizing the installation space leads to axial spacings that, in case of deep-drawn recesses of a bearing support, do not allow for a 360° encircling bearing seat. Therefore, conical bearing seats often appear in bearing supports, which are also detrimental to the service life of the bearing.

SUMMARY

In one aspect of the present teachings, an improved bearing assembly is disclosed, which may overcome one or the above-mentioned disadvantages. In such embodiments of the present teachings, the bearing assembly can be manufactured in a simple, reliable and/or cost-efficient manner. In addition or in the alternative, a stable radial guidance of the bearing is also possible over the entire circumference of the bearing outer ring, which is especially advantageous when bearings are disposed closely together.

In another aspect of the present teachings, a bearing assembly includes a spacer, which is formed as a component that includes cylindrical openings for holding the circumferential surfaces of the bearing outer rings at least across a portion of the width of the bearing outer rings and around the entire circumference of the bearing outer rings, and wherein no fixed connection exists between the bearing support and the spacer.

According to a first embodiment of the invention, the spacer is formed as a one-piece component.

However, it is also possible that the spacer is formed from a plurality of layers, which are stacked one on top of another and have an identical shape. Preferably, the stacked layers are formed in a planar manner and are produced by using a stamping process. The stacked layers can be also connected by a material bonding connection, in particular by welding or by soldering.

As viewed in the direction of the rotational axes of the bearings, the spacer has the shape of an eight.

A segment of the bearing support having a bore can be disposed in a groove of the bearing outer ring. In this case, the bearing support can be axially secured in the groove using a clip ring. The bearing support can also be axially secured in the groove by using a snap-fit connection or by using a flange of the bearing ring. In the alternative, the bearing support can be axially secured on the bearing outer ring using a clip ring that engages in an annular groove on the circumferential surface of the bearing outer ring. It is also possible to axially secure the spacer on the bearing outer ring using a clip ring that engages in an annular groove on the circumferential surface of the bearing outer ring.

The spacer is preferably comprised of sintered metal or cast metal, as long as a stamped part is not preferred.

The invention thus provides a bearing assembly, in which the bearing support that retains the bearings includes a retaining element (spacer) in addition to a bearing support element; the retaining element ensures the stability for supporting radial forces—without having to remain attached to the bearing support plate—, which is achieved by the relatively solidly-formed spacer completely surrounding the two (or also more) bearing rings, which are to be retained with a spacing therebetween, around their circumference. In the area of the bearing seat, the spacer can be constructed from a plurality of individual, thin and plate-shaped layers (elements), wherein the spacer performs its function only after joining the individual layers to form the spacer.

Using the spacer, it is thus ensured that, although the bearing outer ring is not necessarily supported across its entire width, it is supported around its entire circumference. A lack of support is therefore avoided in the area of the closest adjacency of the two bearings; a deep-drawn support plate with pot-shaped recesses cannot provide such support for the bearings according to the prior art. The spacer is, however, not required to be connected with the bearing support plate that is disposed on a further machine part, e.g., on a transmission housing. Moreover, the spacer stabilizes the two to-be-supported bearings relative to each other.

With the inventive proposal, it is possible in an advantageous way to integrate a complete, i.e. 360° encircling, radial support of the two (or more) bearings relative to each other into the bearing support and/or into the bearing assembly. Consequently, an improved roundness of the bearing track results and thus a longer useful life of the bearing.

Low production costs and the problem-free abidance to small tolerances advantageously result, which applies especially to the usage of stamped parts made from plates for the spacer (no deep-drawing processes are necessary, the usage of high-speed presses is possible). The spacer can be constructed from a plurality of uniform layers (elements). A tapering of the bearing seat can be avoided. Consequently, a longer useful life of the utilized bearings results.

The spacer can be produced in an advantageous way by a sintering process, by a stamping process or by a casting process.

The proposed solution is preferably utilized in transmissions, wherein automobile transmissions, in particular, come into consideration. However, the proposed solution can also be utilized in other applications, in which two bearings must be supported close to one another.

An exemplary embodiment of the invention is illustrated in the drawings.

BRIEF DESCRIPTION OF THE DRAWING

FIG. 1 shows a portion of a radial cross-section through a bearing assembly, wherein a portion of a bearing support and the outer ring of a roller bearing is illustrated, which outer ring is retained by the bearing support, as well as a portion of the spacer illustrated in FIG. 2, and FIG. 2 shows a perspective illustration of a spacer that is a component of the bearing assembly according to FIG. 1.

DETAILED DESCRIPTION OF THE INVENTION

In FIG. 1, a bearing support 1 is illustrated, which is intended to support two (of which only one is indicated in FIG. 1) closely spaced roller bearings having rotational axes that are oriented so as to be parallel to one another. This assembly is typical for an automobile transmission, in which two closely spaced shafts must be supported so as to be parallel to one another.

Each of the bearing outer rings 4 of the to-be-retained bearings 2 has a cylindrical outer circumferential surface 5. A bearing support 3 retains the bearings 2 in the desired position. For this purpose, the bearing support 3 includes (two in the case of two to-be-retained bearings 2) bores 9. The bearing outer rings 4 have a groove 10 in a lateral end portion so that the bearing ring 4 can be pushed into the bore 9 of the bearing support 3. In the pushed-in position of the bearing outer ring 4 into the bore 9, an axial fixing can take place using a clip ring or using a flange or—as illustrated—a snap-fit connection can be provided, i.e. the bearing outer ring 4 is axially pushed into the bore 9 until it snap-fits in the bore 9 and is thus axially fixed.

It is important that the bearing assembly 1 further includes a spacer 6. The spacer 6 (for this, view FIGS. 1 and 2 together) is formed as a component that has cylindrical openings 7 and 8 for holding the circumferential surfaces 5 of the two bearing outer rings 4. In this regard, the bearing outer rings 4 are surrounded by the spacer 6 only across a portion of their width B. It is important in this respect that the spacer 6 encompasses the bearing outer rings 4 around their entire circumference.

No fixed connection exists between the bearing support 3 and the spacer 6. Moreover, the spacer 6 engages the circumferential surfaces 5 of the to-be-retained bearing outer rings 4 with an axial clearance. The bearing outer rings 4 have an annular groove 12 in the outer circumferential surface 5 and a clip ring 11 is inserted in the groove 12, whereby the spacer 6 is disposed in a captive manner.

In the exemplary embodiment, the spacer 6 is constructed from a plurality of layers 6', 6", 6''' and 6'''' of individual plates of the same shape that are disposed one upon another. The advantage is that the thin plates can be produced by stamping in a more precise, simple and cost-effective manner than a single thick plate. As a whole, the spacer 6 has (in the case of retaining two bearing) the shape of an eight. It is important that the spacer 6 has—in the present case—two openings 7 and 8 that encircle completely around 360°, i.e. a completely radially-encircling support is provided for the to-be-inserted bearing outer rings.

The present four layers 6', 6", 6''', 6'''' can be connected with each other, e.g., by a soldering or welding process, so that they form a one-piece component.

While the bearing support 3 thus retains the bearings 2 in the proper position, in which they are required, the spacer 6 ensures the stability between the two bearings 2 in a quasi floating manner, since it is not connected with the bearing support 3.

REFERENCE NUMBER LIST 1 bearing assembly
2 bearing (roller bearing)
3 bearing support
4 bearing outer ring
5 circumferential surface
6 spacer
6' layer
6" layer
6''' layer
6'''' layer
7 opening
8 opening
9 bore
10 groove
11 clip ring
12 annular groove
B width of the bearing outer ring

The invention claimed is:

1. A bearing assembly comprising:
at least two adjacently-disposed bearings, each bearing including a bearing outer ring having a cylindrical outer circumferential surface,
a bearing support retaining the at least two bearings such that respective rotational axes of the at least two bearings extend in parallel, and
a spacer having at least two cylindrical openings configured to receive the respective cylindrical outer circumferential surfaces of the bearing outer rings such that a circumferential inner surface of each opening covers at least a portion of a width of the bearing outer ring received therein and surrounds an entire circumference of the bearing outer ring received therein,
wherein the bearing support is not fixedly connected to the spacer.

2. A bearing support according to claim 1, wherein the spacer is formed as a one-piece component.

3. A bearing assembly according to claim 1, wherein the spacer is comprised of a plurality of layers that are stacked one on top of another, each layer having an identical shape.

4. A bearing assembly according to claim 3, wherein each of the stacked layers is planar.

5. A bearing assembly according to claim 4, wherein the stacked layers are produced by stamping.

6. A bearing assembly according to claim 4, wherein the stacked layers are connected with one another by one of welding and soldering.

7. A bearing assembly according to claim 6, wherein the spacer generally has a shape of a figure eight as viewed in the direction of the rotational axes of the bearings.

8. A bearing assembly according to claim 7, wherein a bore is defined in the bearing support, a first groove is defined in the cylindrical outer circumferential surface of each bearing outer ring and the first grooves are disposed in the bore of the bearing support.

9. A bearing assembly according to claim 8, wherein the bearing support is axially secured in the first grooves by at least one of at least one first clip ring, a snap-fit connection and a flange extending from each bearing outer ring.

10. A bearing assembly according to claim 9, wherein the first grooves are annular.

11. A bearing assembly according to claim 10, wherein a second annular groove is defined in the cylindrical outer circumferential surface of each bearing outer ring, at least one second clip ring is engaged in the second annular grooves and the spacer is axially retained in a floating manner between the at least one second clip ring and the bearing support.

12. A bearing assembly according to claim 11, wherein the spacer is comprised of one of sintered metal and cast metal.

13. A bearing assembly according to claim 1, wherein a bore is defined in the bearing support, a first groove is defined in the cylindrical outer circumferential surface of each bearing outer ring and the first grooves are disposed in the bore of the bearing support.

14. A bearing assembly according to claim 13, wherein the first grooves are annular, a second annular groove is defined in the cylindrical outer circumferential surface of each bearing outer ring, at least one clip ring is engaged in the second annular grooves and the spacer is axially retained in a floating manner between the at least one clip ring and the bearing support.

15. A bearing assembly according to claim 14, wherein the spacer generally has a shape of a figure eight in a top view.

16. A bearing assembly according to claim 1, wherein the spacer generally has a shape of a figure eight in a top view.

17. A bearing assembly according to claim 1, wherein the spacer is axially retained in a floating manner between the bearing support and at least one clip ring disposed around at least one bearing outer ring.

18. A bearing assembly according to claim 1, wherein there is an axial clearance between the spacer and the bearing support.

19. A bearing assembly comprising:
a bearing support having a bore defined therein,
a first bearing having a first bearing outer ring disposed in the bore,
a second bearing having a second bearing outer ring disposed in the bore, and
a spacer having a first cylindrical-shaped opening configured to receive and entirely surround a cylindrical outer circumferential surface of the first bearing outer ring and a second cylindrical-shaped opening configured to receive and entirely surround a cylindrical outer circumferential surface of the second bearing outer ring,
wherein the first and second cylindrical-shaped openings are further configured to retain the first and second bearings in a parallel relationship and the spacer is not fixedly connected to the bearing support.

20. A bearing assembly according to claim 19, wherein the spacer has a substantially figure eight shape comprised of stacked, planar layers that are welded or soldered together, there is an axial clearance between the spacer and the bearing support and the spacer is axially movable relative to the bearing support during operation of the bearing assembly.

* * * * *